United States Patent [19]

Scerbbo, III

[11] Patent Number: 5,991,132
[45] Date of Patent: Nov. 23, 1999

[54] CASSETTE CASING WITH A PERMANENTLY REMOVABLE NONREATTACHABLE PHYSICAL STRUCTURE

[76] Inventor: Frank C. Scerbbo, III, P.O. Box 5271, Parsippany, N.J. 07054

[21] Appl. No.: 08/937,998

[22] Filed: Sep. 26, 1997

[51] Int. Cl.[6] .................................................. G11B 23/02
[52] U.S. Cl. ......................................... 360/137; 360/132
[58] Field of Search .................................. 360/132, 137; 242/341; 70/58; 206/308.2, 387.11

[56] References Cited

U.S. PATENT DOCUMENTS

| | | | |
|---|---|---|---|
| 3,612,774 | 10/1971 | Wiklund | 360/128 |
| 3,724,858 | 4/1973 | Martin | 360/96.1 |
| 4,333,568 | 6/1982 | Weldin | 206/387.1 |
| 4,385,693 | 5/1983 | Gelardi et al. | 206/387.1 |
| 4,545,483 | 10/1985 | Shiba et al. | 206/387.1 |
| 4,716,745 | 1/1988 | Hehn | 70/58 |
| 4,796,771 | 1/1989 | Stettler | 215/253 |
| 5,400,185 | 3/1995 | Scerbo, III | 360/5 |

FOREIGN PATENT DOCUMENTS 64-37788  2/1989  Japan .

Primary Examiner—David D. Davis
Attorney, Agent, or Firm—William T. Hough, Esq.

[57] ABSTRACT

A tape cassette having a feed reel and a takeup reel with tape on the reels and a mounting cassette casing for enclosing the feed reel, the takeup reel and the tape. The mounting cassette casing having an exterior perimeter with a permanently removable nonreattachable blocking physical structure affixed to and protruding beyond the exterior perimeter of the mounting cassette casing to break upon insertion in a tape cassette apparatus unable to receive the permanently removable nonreattachable blocking physical structure revealing an altered appearance.

6 Claims, 5 Drawing Sheets

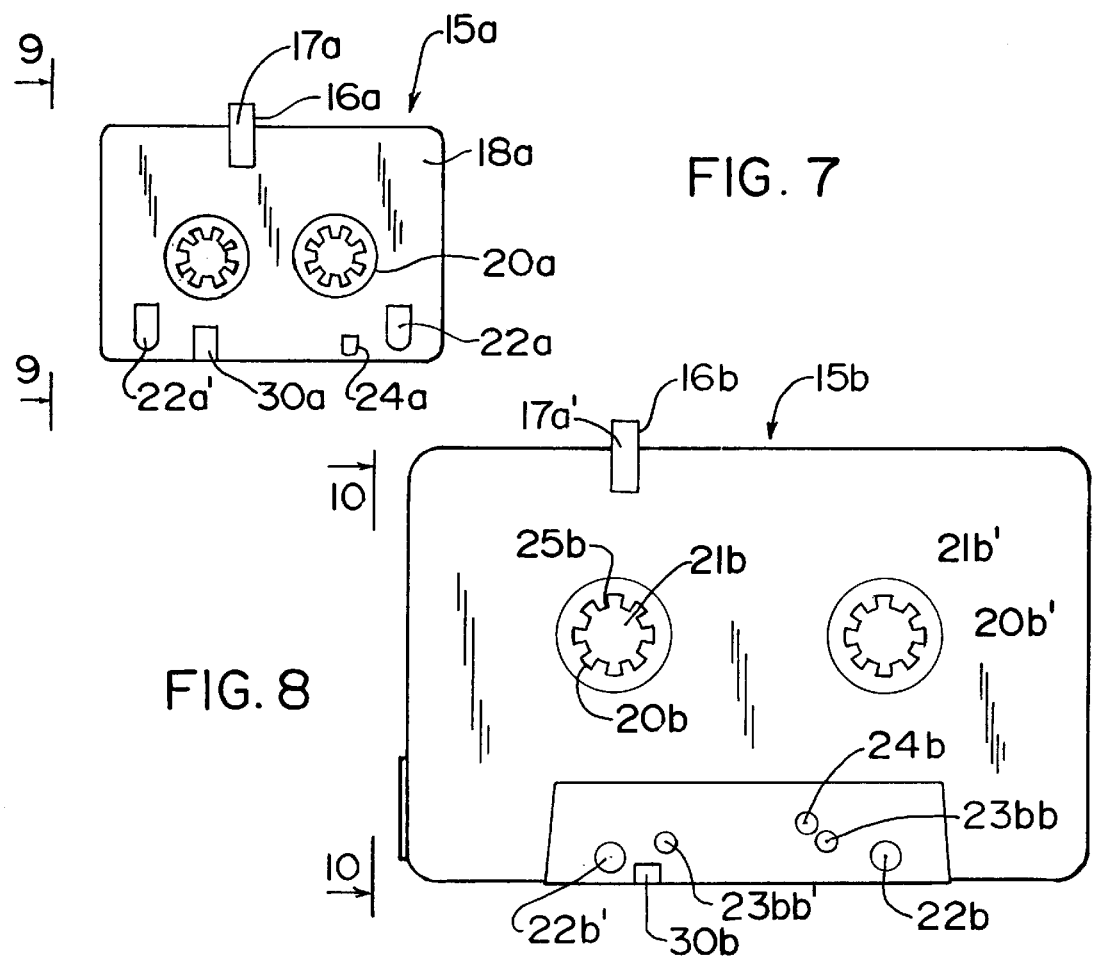
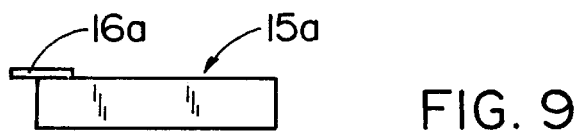
FIG. 9
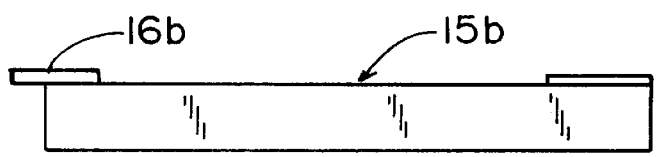
FIG. 10

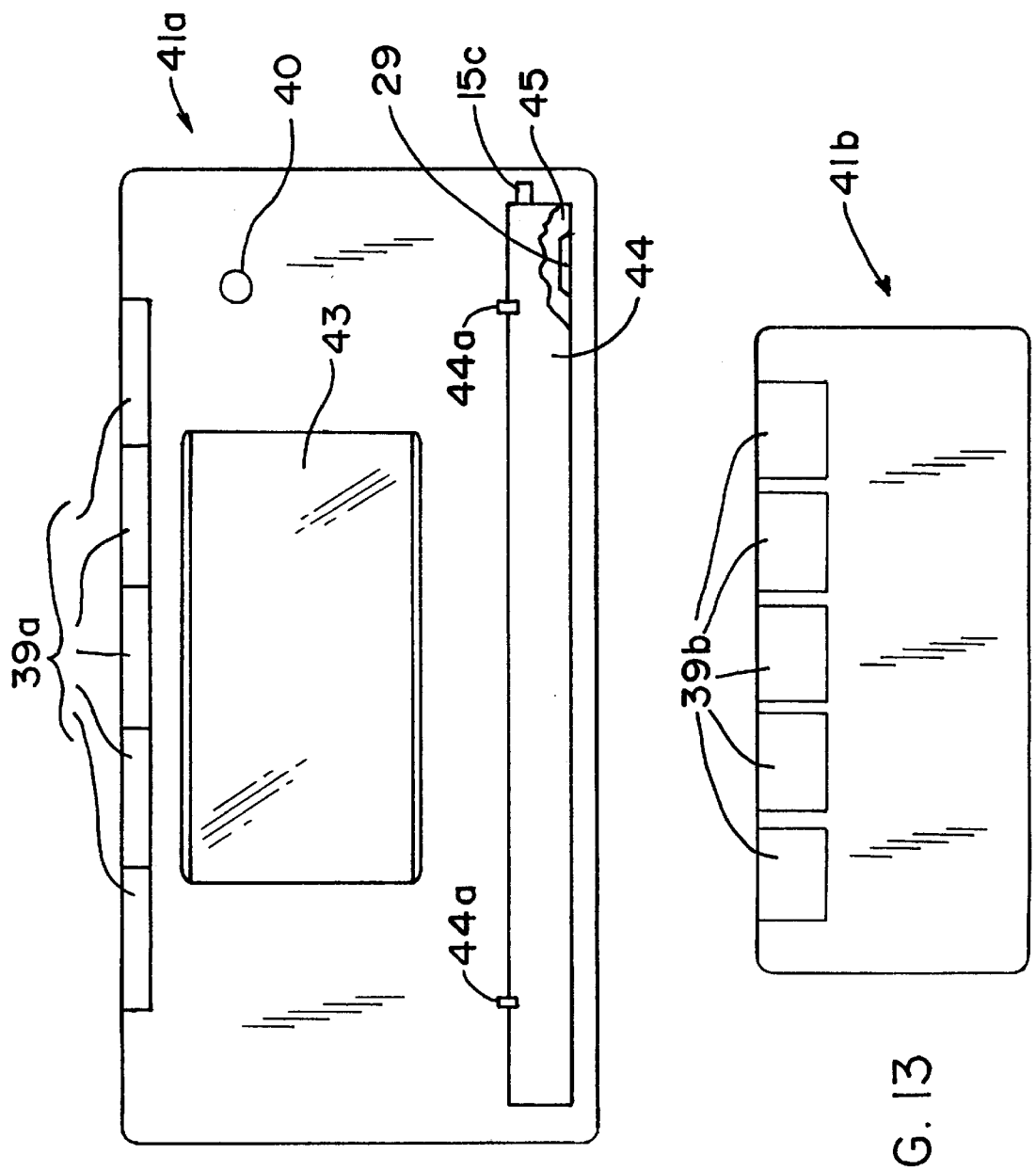

CASSETTE CASING WITH A PERMANENTLY REMOVABLE NONREATTACHABLE PHYSICAL STRUCTURE

CROSS-REFERENCES TO RELATED APPLICATIONS

The description of the invention necessarily embodies critical consideration of each of prior art and background and objects of the invention, as follow, and is a continuation-in-part of the same inventor's: 1) pending U.S. Ser. No. 08/740390 filed Oct. 29, 1996, directed in-part to common subject matter, with application-filing continuity therebetween.

BACKGROUND OF THE INVENTION

A prior art search of:

United States Patent Office Class 242, subcasses 613 and 613.1, and United States Patent Office Class 96.1 and 96.5.

While no relevant prior art was located, the sole patent found of interest is Stumpfi U.S. Pat. No. 4,515,331 issued May 7, 1985 having alternate rigid teeth and depressable spring-biased teeth depressable radially outwardly from any extended state inward position mountable on a small spindle to a depressed state mountable on a larger spindle that also is mountable by the remaining alternate teeth. That patent has no discernible bearing on nor relevance to the present invention.

This invention arose from potential problems that could be confronted by the lack of judicial evidentiary integrity being retained for recorded events embodied on audio and/or video tapes taken typically by the present inventor's patent patented subject matter of U.S. Pat. No. 5,400,185 issued Mar. 21, 1995 entitled Evidence Recorder and method of securing, and U.S. Pat. No. 5,545,129 issued Aug. 13, 1996, former U.S. Ser. No. 08/489,380 filed Jun. 12, 1995. The invention of aforenoted U.S. patent application Ser. No. 08/740,390 and the present invention are each directed to avoiding such potential problems that could preclude admission of such recorded tapes as admissible evidence in judicial proceedings.

Apart from the preceding problems with the taking of any evidence by an audio and/or video cassette(s), is the fact that heretofore the tape could be reversed to utilize the second (opposite direction of winding) unrecorded side or edge of the tape. Such permissive practice invites disaster, when for example typically a police officer is preoccupied with impending or already present pressures of following and/or apprehending or investigating an already impending matter, that he will inadvertently load-up the tape for recording backward as to accidentally record-over the other side—the officer having forgotten and/or unaware of another officer having already once before reversed the cassette. Likewise, the police officer inadvertently might think that he has already reversed a tape for the purpose of recording on the opposite side, and based on that mistaken thought, he thereafter attempts to further record on the same fully recorded side—only to subsequently disasterously discover that the latest evidence did "not" get recorded at all.

The present invention accordingly includes as part of its objects, the creation of audio reel-tape(s) and/or video-audio combination tape(s) avoid the possibility of occurance of aforenoted problems, and of the creation of novel casing(s) and/or recorders preclude such problems. Moreover an object are to alter one or more of the tape recorder and of the cassette casing(s) such that there would be precluded the possibility of intentional seruptitious tampering with or accidentally wiping-out or mutilating recorded evidence from a tape, initially and/or originally recorded data on such reel-mounted tapes.

Another object is to avoid substitution use of cassette tapes devoid of the protection(s) afforded by this invention, to require audio and/or video cassette recorder and/or player to embody structure that precludes insertion and/or operation of any cassette recorder and/or player reel-containing casings that do not embody such protection(s).

SUMMARY OF THE INVENTION

Broadly the invention is generically directed to a novel tape reel(s)-enclosing and mounting casing(s). The novel casing includes permanently-removable physical structure structured and positioned such that prior to removal of blocking(s) portion(s) thereof, insertion thereof operatively into otherwise conventional audio or video tape cassette recorder(s) or cassette player(s) is precluded with regard to receipt of typically conventional type tape reel(s)-enclosing and mounting casing(s) normally operatively mountable therein.

In a first preferred embodiment on the preceading broad generic invention, the foregoing tape reel(s)-enclosing and mounting casing includes at least one post-mounting hole necessary for mounting in (for) at least a conventional "audio" (non-video type) tape cassette recorder and/or cassette player; however, the at least one mounting hole include(s) additional initially set (anchored) but permanently removable shape-altering casing structure of a paired reels embodying cassette casing. The initially set shape-altering casing structure is detectably permanently "resetablem" within its mounting hole once it has been removed therefrom. Thus, once removed, the initially set (anchored) shape-altering casing structure cannot thereafter be adequately reinserted in a manner that would have the same unaltered appearance, i.e. could not there after be reinserted in a manner that would appear to have been never previously removed from its anchored state and position. While this or these shape-altering casing structure(s) of this invention thereof is/are required to be removed and/or altered prior to successful operative insertion of the casing into a conventional audio tape cassette recorder or player, accordingly removal thereof permanently establishes that the collected evidence on that tape is not longer court-admissible evidence if at the time of removal it is "outside of" proper attorney or official custodian police officer or official court custody or the like. Prior to initial removal thereof, the non-initially removed set (anchored) prior to its permanent removal, prevents the shape-altering casing-structure from being operably inserted into a conventional audio and/or video cassette recorder and/or cassette player.

In a second preferred embodiment supplemental to the first preferred embodiment and likewise to the above described generic invention, there is conventionally included at least one mounting hole-forming structure necessary for operative mounting in at least a conventional "video" (or "audio-video combination") cassette tape recorder and/or player. Likewise, the at least one mounting hole include(s) additional initially set (anchored) but permanently removable shape-altering casing-structure of a paired-reels-embodying cassette casing. The initially set shape-altering casing-structure is detectably permanently resetable within its mounting hole once having been removed therefrom. Thus, likewise for this video embodiment, once the initially set shape-altering casing-structure is initially removed, it cannot thereafter be adequately reinserted in a manner that would "appear" to be the same as before initial removal, i.e. it could not there after be reinserted in a manner that would appear to have been never initially removed. While this or these shape-altering casing-structure(s) of this invention thereof is/are required to be removed and/or altered prior to successful operative insertion of the casing into a conventional audio tape cassette recorder and/or cassette player, accordingly removal thereof permanently establishes that the collected evidence on that tape is not longer court-admissible evidence if at the time of removal it is "outside of" proper attorney or official custodian police officer or official court custody. Prior to initial removal thereof, the nonunitially removed set (anchored) but permanently removable shape altering casing structure prevents operable insertion into a conventional audio and/or video cassette recorder and/or cassette player.

In a third preferred "video" embodiment as supplemental to both the second preferred "video" and/or audio embodiment and in the alternative likewise the above described generic invention, there is included additionally at least one additional accessory structure that does not form any conventionally required (typically post) mounting hole (that would be required for the mounting thereof operatively onto a video and/or audio cassette recorder or player or recorder-video player combination thereof). There is an outer exterior shape-altering initial (original) typically substantially continuous "integral" (anchored) structure, but which is permanently shearable and/or removable and/or susceptable to being broken-off from otherwise adjoined typical video and/or audio cassette reel(s) enclosing case structure that prior to typically detachment, breaking off, shearing off thereof (or moving out of the way) is otherwise mountable or susceptable to be mountable in at-least a conventional "video" or combination video audio type tape cassette recorder and/or audio recorder and/or player. This outer exterior non-hole forming and/or nonhole, plugging structure is exterior shape altering structure initially unaltered as adjoined to the cassette reel(s) enclosing case structure. It is of or has a composite-shape and orientation that "precludes" operable mounting of its adjoined cassette reel(s) enclosing case structure of a conventional video (or audio or audio-video combination) tape cassette recorder and/or combined audio-video cassette recorder and/or cassette player, devoid of first detaching or otherwise removing the exterior shape-altering structure.

In another preferred embodiment improvement on the aforenoted generic invention, there is provided in combination with the tape reel(s)-enclosing and mounting casing, additionally a tape cassette recorder and/or player. It/they include(s) a raised higher-seating level than a lower-positioned lower-face of the video and/or audio cassette tape and/or video lower face of a cassette tape reel(s)-enclosing and mounting casing 's lower face that constitutes seating structure. It seatably projects upwardly in and is receiveable snugly within a recess in the A-bottom (lower or broad) face of the invention's tape reel(s)-enclosing and mounting casing. In this embodiment. The cassette tape audio and/or video seating structure (of an audio and/or video unit of this invention) includes a non-detachable permanently-mounted physical structure. As a result thereof, there is precluded a mounting thereon either of a conventional cassette audio and/or video tape reel(s) encasing casing—because of the conventional casings failing to fit and/or conform. In another preferred embodiment to this described embodiment thereof, the nondetachable physical structure is nonsymetrically positioned relative to other present symmetrically positioned non-symetrical tape reel(s)-enclosing and mounting casing. This latter arrangement assures that conventional reel(s) containing cassette casing(s) is(are) precluded from being mountably mateable with the one reel(s) containing cassette casing-mounting non Dymetrically positioned male structure relative to at least one other mounting hole of the cassette tape reel(s) enclosing and mounting casing(s). As a still further additional improvement on the foregoing embodiment(s), the at-least one of the nondetachable physical structure(s) include(s) the presence of at least one cassette mounting post(s) for mounting the cassette tape reel(s) enclosing and mounting casing(s), for an audio and/or video recorder and/or player.

In another additional embodiment inclusive of the aforenoted combination inclusive of a cassette tape recorder and/or player, the at-least one of the nondetachable physical structure is at-least one cassette mounting post for mounting the audio and/or video cassette tape reel(s)-enclosing and mounting casing(s).

In another preferred embodiment of the foregoing combination inclusive of an improved cassette tape recorder and/or player (with or without aforenoted improvements thereto), the at least one of the non-detachablephysical structure is(are) at least one cassette exterior surface indenture forming structure. The exterior surface indenture-forming structure forms a surface-shaped recess receiveable of a substantially correspondingly positioned mounting casing mounting exterior in a state of being elevated, as a part of at-least one of a cassette video and/or audio tape recorder.

BRIEF DESCRIPTION OF THE DRAWINGS

FIG. 7 diagrammatically and symbolically illustrates in an elevation bottom plan view for the embodiment of FIG. 1 of the non-detachable physical structure as a miniature cassette casing's exterior bottom face surface having separately each of a) an indenture(recess)-forming structure as recess receiveable and b) a laterally extending key, of a substantially correspondingly positioned mounting casing mounting exterior elevated of an audio tape recorder of FIG. 6.

FIG. 8 diagrammatically and symbolically illustrates in an elevation bottom plan view for the embodiment of FIG. 2 of the nondetachable physical structure as a typically-sized conventional cassette casing's exterior bottom face surface having separately each of a) an indenture(recess) forming structure as recess receiveable and b) a laterally extending key, of a substantially correspondingly positioned mounting casing mounting exterior elevated of an audio tape recorder of FIG. 11, inclusive of recess forming structure as recess receiveable of a substantially correspondingly positioned mounting casing mounting exterior elevated of a video tape recorder, mountable on the upper face illustrated in FIG. 6.

FIG. 9 diagrammatically and symbolically illustrates an elevation side view as taken along line 9—9 of FIG. 7.

FIG. 10 diagrammatically and symbolically illustrates an elevation side view as taken along line 9—9 of FIG. 8.

FIG. 12 diagrammatically and symbolically illustrates an elevation plan top view of a video recorder of this invention, receivable of the video tape casing of FIG. 3, other than for noted features of this invention, being otherwise the same as typically a conventional video recorder.

FIG. 13 diagrammatically and symbolically illustrates plan front-edge view of a video recorder of FIG. 12, receivable of the video tape casing of FIG. 3, other than for noted features of this invention, being otherwise the same as typically a conventional video recorder.

DETAILED DESCRIPTION OF THE INVENTION

Figure 1:
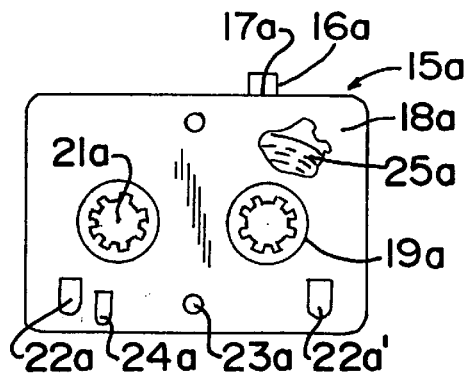
FIG. 1 diagrammatically and symbolically illustrates in elevation plan view, a top (upper) broad-face of a audio and video-combination cassette tape reel(s) mounting miniature sized casing embodying several embodiments of the present invention, but otherwise embodying conventional mechanism of operation.

The evidence recorder and method of securing disclosed in U.S. Pat. No. 5,400,185 and the sidearm handgun holster-mounted surveillance recorder carrier vessel of U.S. Pat. No. 5,545,129 as tamper proof devices, in so far as ultimate securing against a still potential weak link in avoiding potential problems in maintaining the integrity of evidence ultimately reaching a courtroom, that problem was at-least partially overcome by the further invention of aforenoted U.S. Ser. No. 08/740,390 patent application, but by the improvements of the present invention are believed to be totally eliminated.

In addition to the solution embodied in the aforenoted U.S. Pat. No. 5,545,129, the aforenoted present invention as additional solutions to that/those problem(s), by the above described present invention is in greater detail described as follows.

Such risks are avoided/obviated when tape cassette reel(s)-mounting casings are designed and manufactured specifically for initial sole utilization with the cassette tape recorder mountable of solely the modified cassettes tape recorder reel(s) mounting casings of the present invention.

In the light of the foregoing prior art of background, the invention in its broadest embodiment, is directed to one or more alternate and further improved embodiments to that/those disclosed and claimed in aforenoted pending U.S. Ser. No. 08/740,390. The audio or audio-video tape cassette mountable reel(s) casing of aforenoted application(s) and/or patents, but concurrently is also mountable on (utilizable in) any conventional prior art tape cassette recorder(s) and/or players after minor but permanent modification of the inventive reel(s) mounting casing mounting the paired cassette reels. The primary improvement advance in/of the present invention lies in the simplicity of the nature of modification(s) to otherwise conventional type reel(s)-mounting casing which optionally may also include features of the prior patents and aforenoted U.S. Ser. No. 08/740,390.

Moreover, the feature of utilizing otherwise conventional type reel(s)-mounting casings by merely adding the features thereto of the present invention, result in significant reductions in cost of manufacture thereof while benefiting from the present invention being made a part thereof at much more financially feasible costs thereof while concurrently continuing to prevent seruptitious secretive modification of recorded subject matter prior to being able to play the tape of the novel reels-containing casing combination of this invention.

Accordingly, in accomplishing the foregoing objects and benefits, the present inventive audio and/or video tape reel(s) enclosing (and mounting) casing(s) broadly include (s) physically blocks and/or shields one or more holes and/or include(s) additional permanently removable shape altering casing structure of the invention's paired-reels cassette casing requiring physical removal and/or alteration thereof in order for it to be operatively mountable within typical and/or all conventional tape cassette recorder(s) and/or players. Other remaining conventional mounting aperture(s) and/or shapes may continue to be present—those remaining ones thereby not requiring any modification prior to mounting inventive tape reel containing casing on a conventional cassette recorder and/or player. Accordingly, use of the inventive cassette recorder and/or player reel(s) containing casing(s), on a typically conventional cassette tape player and/or recorder is precluded prior to the removal and/or cutting out and/or shearing and/or punching out (or the like)the plugging media of a novel cassette tape-recording reel(s) containing casing of this invention that incorporates plug(s) from within or covering one or more heretofore coventional aperture(s) and/or hole(s) required for such conventional tape recorder(s) and/or player)s) to accept (to be acceptable/mountable of) a mounting post of (present in) conventional tape recorder(s) and/or player(s) reel(s)-mounting casing.

Likewise, for a novel cassette reel(s) enclosing casing having casing-added exterior shaping structure thereof, the novel cassette reel(s) enclosing casing cannot be operatively mounted in a conventional cassette recorder and/or player, devoid of first typically breaking off and/or shearing off and/or otherwise removing the supplemental casing added exterior shaping structure thereof.

In an additional improvement, the tape recorder of this invention in another preferred embodiment, includes additional functional and/or design-features in the nature of one or more spaced apart post(s) positioned at novel position(s) different from one or more of normal positions for conventional tape recorder(s) and tape recorder(s) and the cassette reel(s) containing casing contains one or more additional matching hole(s) positioned to be receivable of that/those additional post(s). Thereby, novelly, a conventional cassette reel(s) containing casings are not utilizable for recording thereon by cassette recorder(s) of the present invention; such exclusion asures avoidance of aforenoted problems of loss of integrity of recorded matter as potential court admissible evidence.

The improvement in the aforenoted tape mounting reel case for cassette recorder(s) and/or player(s) preferably may encompass (include) some one or more functional and/or design parts/features of the prior tape-mounting rule to the extent aforenoted, thereby reducing costs of manufacture. The broad improvement thereof includes as a combination the following.

The present invention eliminates and precludes the possibility of a prerecorded and/or of a partially prerecorded substrate or tape from being non-detectably subsequently additional/supplements subsequent inserted into previously initially recorded data subsequent to the removal of the hole plug and/or cover and/or of the irregularly-shaped portion of the reel(s) mounting casing. Detection of such modification or alteration or removal of a plug or cover thereof or of a shearable or break-off portion of the initial inventive casing to being placed in the hands of an appropriate official (for example) render the integrity and/or original recorded content of the tape, as now contestable—i.e. not continuing to be good evidence for utilization as probative value thereof in a court proceedings. Such invention averts the possibility of creating and/or modifying originally good evidence into (rendering it) tainted and/or false evidence and/or testimony.

The present invention by selective positioning of additional additional post(s) on the recorder of this invention, together with matched hole(s) nonDymmetrical and/or nonbilateral, eiminates and precludes the possibility of accidental insertion backwards of an initial fresh tape/reel/cassette into the recorder of this invention, i.e. precludes its insertion non-functionally backwardly and/or up side down.

Likewise, additional and non-bilateral and/or non-symmetrical arrangement of the additional posts of the recorder and matching holes of (in) the cassette tape casing of present invention eliminates and precludes the possibility of recording on both sides of the tape/reel/cassette.

The invention provides/permits the altering of the cassette reel(s)-embodying casing such that thereafter it may be rewound and "played back" on a typically conventionally designed tape player and/or cassette, but will not fit on nor be thereupon receivably mountable on the recorder of this invention, and/or will not contain the original plugs and/or additional shearable or otherwise removable casing portions as aforenoted.

Accidental remounting of a recorded tape onto the recorder of this invention is precluded because it cannot be rewound by the recorder of this invention, and can be rewound solely on some other recorder or cassette player solely after the aforenoted alteration of one or more of the mounting holes and/or covers thereof and/or shape of the cassette reel(s) mounting casing.

The recorder of this invention encompasses and includes as might be desirable and advantageous any of conventional technology in mechanics, electronics one or both thereof as currently available in today's technology, and/or by equivalents thereof.

In combination with one or more of the embodiments of the aforestated mechanical combinations, the improved utility of use thereof in effective maintaining of evidentiary integrity of recorded evidence on a tape thereof, preferably includes a procedure (method) of altering the configuration from the inventive shape and/or form to the conventionally utilizable form and/or shape playable on a conventional tape and/or cassette player, solely when within the presence of a police or other reliable evidence maintaining integrity-person(s), is preferred; such avoids destroying its value as credible irrefutable evidence.

Thereby the present invention provides for preserving indisputable proof(s) and/or evidence of admissible integrity for court utilization thereof.

The present invention utilizes novel selected temporary nonreinsertable hole plug(s) and/or hole covering and/or change in shape via removable portion(s), prior to such alteration and/or removal, being a deviation from normally essential shape conventionally necessary for insertion thereof into a conventional cassette tape recorder and/or tape player.

In one embodiment of the invention, the reel(s) embodying cassette and/or recorder casing has essential mounting hole(s) with a permanently-removable non-insertable (incapable of being suerreupticiously reinsertable/remountable) temporary plug or hole-cover 14. Permanent removal of a plug media or other covering media or element or the like and/or irreplaceable shearable and/or breakable added shape altering casing portions intermittently altering the otherwise reel(s)-mountable casing. The cassette-mountable reel(s)-casing is accordingly initially operatively non insertable into (receivable by) a conventional cassette recorder and/or player by virtue of in intermittent difference in the presence of a plugged hole in the reel(s) containing cassette casing. Thereby temporarily preventing mountable insertion of the inventive cassette reel(s) mounting casing into an operative position and state within a conventional cassette recorder and/or cassette—in the absence of first removal of the blocking media within and/or over the required hole necessary for conventional mounting thereof with such conventional cassette recorder and/or player.

In the embodiment of FIGS. 1 and 7, one embodiment of the reel(s)-embodying cassette and/or recorder casing 15a has essential mounting irreplaceable shearable and/or breakable added shape altering protruding casing portions 16a intermittently altering the otherwise reel(s) mountable casing 15a. The cassette-mountable reel(s)-casing 15a is accordingly initially operatively noninsertable into (receivable by) a conventional cassette recorder and/or player by virtue of in intermittent difference in the presence of the differing irregular shape of the reel(s) embodying casing 15a prior to the breaking off and/or shearing of the irregular and/or additional aforenoted casing protruding casing-portion 16a shearable and/or breakable along either imaginary and/or scored line 17a.

FIG. 1 illustrates in elevation plan view a broad top face 18a of a conventional miniature sized cassette tape reel(s) embodying casing 15a having a typically conventional operatively mounted driving reel 19a and following a typically conventional driven rotatable reel 20a mounted on a typically conventional non driven follower reel rotatable member 21a typically having a conventional drag mechanism (not illustrated) to keep taut a feed film 25a being fed therefrom. in elevation plan view, a top (upper) broad-face 18a of a audio and video combination cassette tape reel(s)-mounting miniature sized casing 15a embodying several embodiments of the present invention, but otherwise embodying conventional mechanism of operation.

Figure 2:
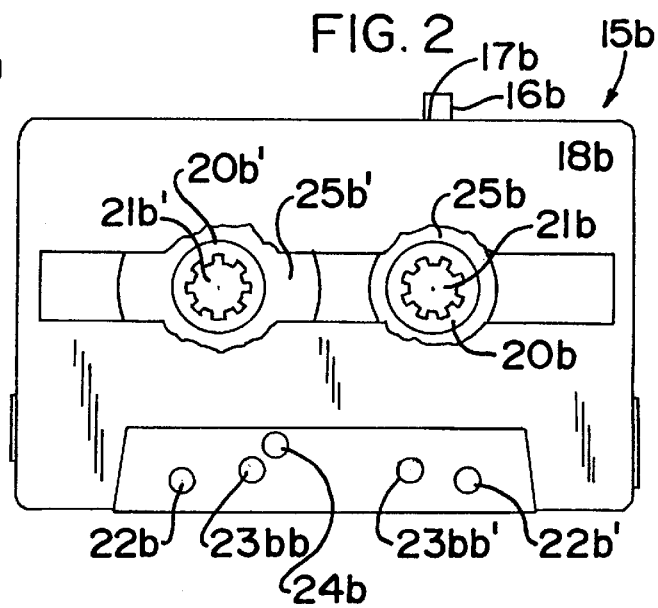
FIG. 2 diagrammatically and symbolically illustrates in elevation plan view, a broad-face of a solely audio cassette tape reel(s) mounting standard sized casing embodying one or more several embodiments of the present invention, but otherwise embodying conventional mechanism of operation for the present invention.

FIG. 2 diagrammatically and symbolically illustrates in elevation plan view, a broad face 18b of a solely audio cassette tape reel(s) mounting standard-sized casing 15b embodying one or more several embodiments of the present invention having features/elements corresponding to or the same as set forth for the FIG. 1 embodiment, but otherwise embodying conventional mechanism of operation of the present invention. Also conventional typical take up film 25c is shown.

Figure 3:
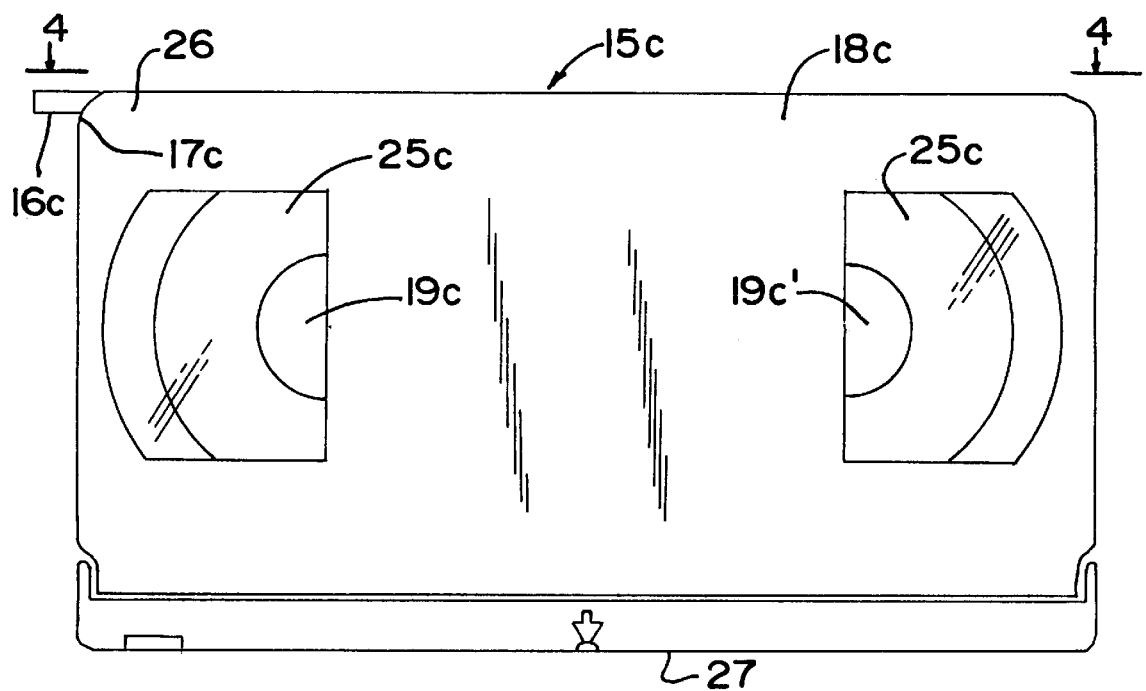
FIG. 3 diagrammatically and symbolically illustrates in elevation plan view, an upper face of an alternative audio and video-combination cassett tape reel(s) mounting casing embodying several embodiments of the present invention, but otherwise embodying conventional mechanism of operation, mountable on a video recorder of FIG. 12.
Figure 4:
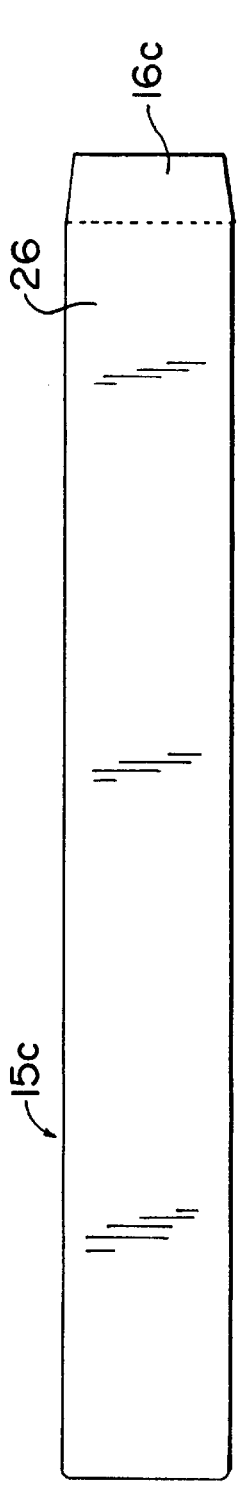
FIG. 4 diagrammatically and symbolically illustrates in elevation side view a typical tape viewable edge-side of an audio and video cassette tape unit as viewed along line 4—4 of FIG. 3.

FIG. 3 diagrammatically and symbolically illustrates in elevation plan view, an upper face of an alternative audio and video combination cassette tape reel(s) mounting casing 15c embodying several embodiments of the present invention, but otherwise embodying conventional mechanism of operation, mountable on a video recorder of FIG. 12. Likewise this video includes the shearable or break off extension (protrusion) having a detent (narrowed thickness) 15d, located at a rearward portion 24 and extending sidewardly (laterally). Recessed portion 15f allow this inventive embodiment to properly seat on a upward protrusion 29 from the inventive cassette recorder of FIG. 12. Also conventional forward face 27 is indicated. FIG. 4 diagrammatically and symbolically illustrates in elevation side view a typical tape viewable edge-side of an audio and video cassette tape unit as viewed along line 4—4 of FIG. 3. There is an inventive through-slot 28 extending between and through forward and rearward edges through which the video recorder upwardly-extending protrusion 29 is slidably seatable during the act of insertion (mounting) the video cassette casing of FIG. 3, 4 and 5.

Figure 5:
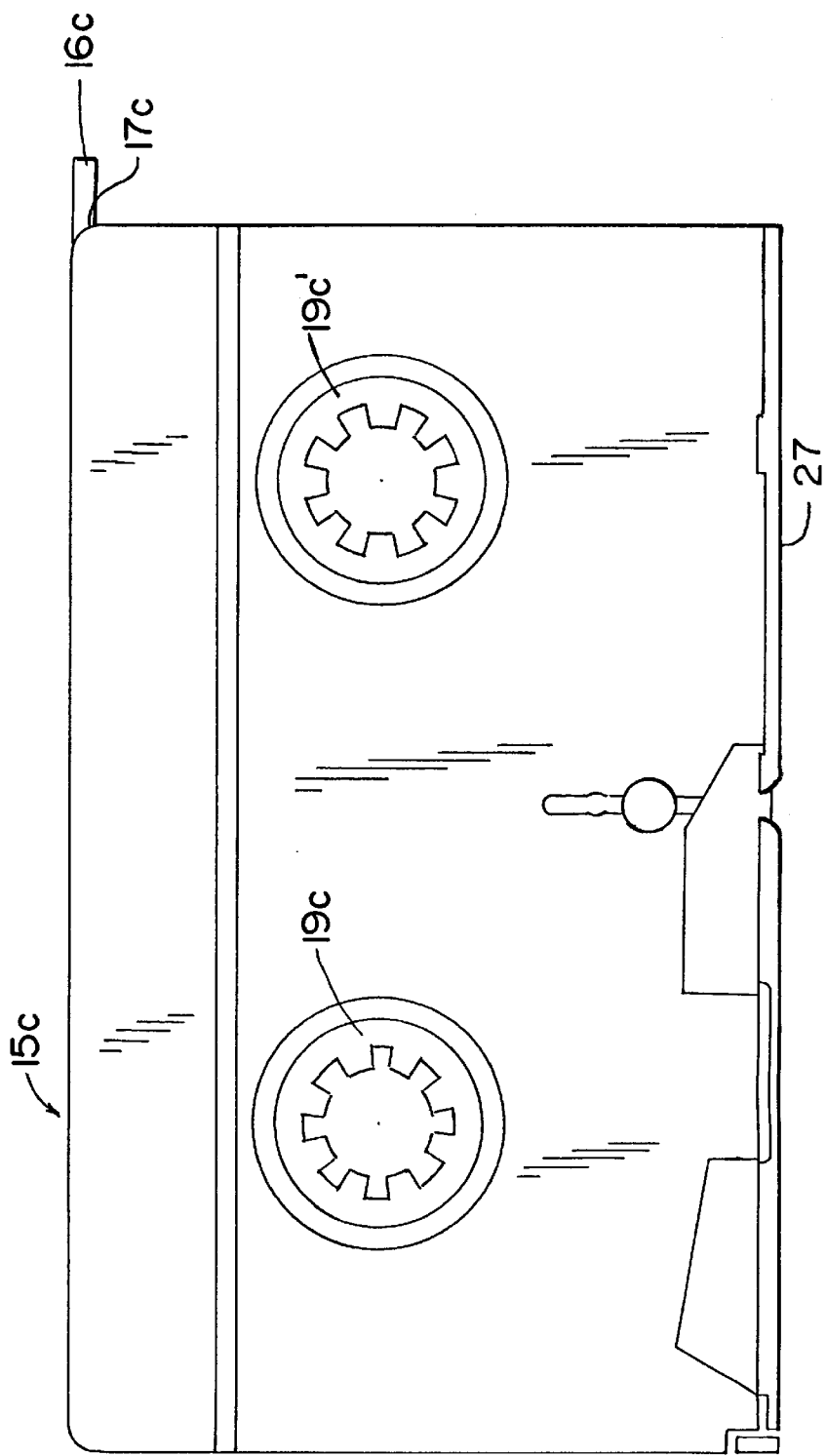
FIG. 5 diagrammatically and symbolically illustrates an elevation bottom face view of the audio and video cassette tape unit of FIG. 2 and 4.

FIG. 5 diagrammatically and symbolically illustrates an elevation bottom face view of the audio and video cassette tape unit of FIGS. 3 and 4.

Figures 6, 11:
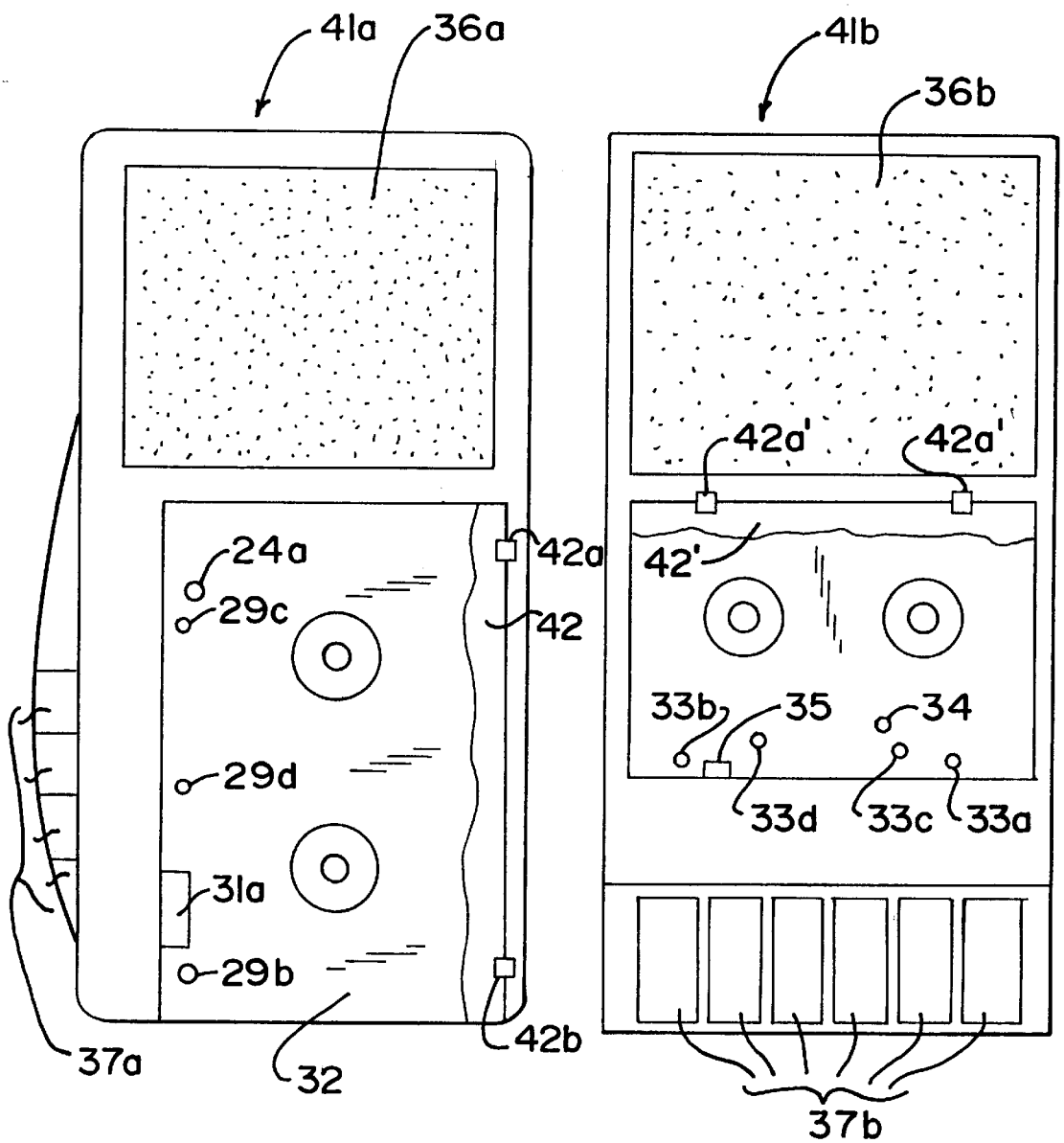
FIG. 6 diagrammatically and symbolically illustrates in an elevation top plan view the nonDymmetrically mounted nondetachable physical structure as being a miniature audio cassette tape recorder (solely recorder) having mounting post(s) for mounting the cassette tape reel(s) enclosing and mounting casing(s) mountable of the miniature audio tape cassette of FIG. 1.
FIG. 11 diagrammatically and symbolically illustrates in an elevation top plan view the non-symmetrically mounted non-detachable physical structure as being an audio cassette tape recorder (solely recorder) having mounting post(s) for mounting the cassette tape reel(s)-enclosing and mounting casing(s) mountable of the typically conventional-sized audio tape cassette of FIG. 2.

FIG. 6 diagrammatically and symbolically illustrates in an elevation top plan view the aforenoted nonsymmetricalUy mounted nondetachable physical structure as being a miniature audio cassette tape recorder (solely recorder nonenclusive of player mechanism) having conventional mounting post(s) 29a and 29b and non aligned mounting posts 29c and 29d for mounting the inventions cassette tape reel(s)-enclosing and mounting casing(s) mountable of the miniature audio tape cassettes of FIGS. 1 and 7 through 10. Additional are conventional features such as the speaker 36a, operating keys (switches) 39a, and lid 42 and hinges 42a thereof.

FIG. 7 diagrammatically and symbolically illustrates in an elevation bottom plan view for the embodiment of FIG. 1 of the nondetachable physical structure. Apart from previously identified structure, the miniature cassette casing's exterior bottom face-surface has additionally indenture(recess) forming structure 30 as recess receivable of the FIG. 6 recorder's raised male portion 31 of the floor 32 of the seating tape recorder 41a. In addition, there is the aforedescribed laterally extending key, of a substantially correspondingly positioned mounting casing mounting exterior elevated of an audio tape recorder of FIG. 6.

FIG. 8 diagrammatically and symbolically illustrates in an elevation bottom plan view for the embodiment of FIG. 2 of the nondetachable physical structure as a typically sized conventional cassette casing's exterior bottom face-surface having separately each of a) an indenture(recess) forming structure 30b as recess 30b receivable and b) a laterally extending key 16b, each and both of different ones of substantially correspondingly positioned mounting casing mounting exterior elevated structures of an audio tape recorder of FIG. 11. Included is the non aligned mounting post aperture/hole 24b, and the recessed structure (forming a recess) 30b, in addition to the plug 22b (removable plug of that mounting hole), and the mounting holes 22b, 23bb and 23bb'. Other elements have been previously described. The recess is receiveable and seatable of a substantially correspondingly positioned mounting casing mounting exterior elevated of a video tape recorder, mountable on the upper face illustrated in FIG. 6.

FIG. 9 diagrammatically and symbolically illustrates an elevation side view as taken along line 9—9 of FIG. 7.

FIG. 10 diagrammatically and symbolically illustrates an elevation side view as taken along line 9—9 of FIG. 8.

FIG. 11 diagrammatically and symbolically illustrates in an elevation top plan view the nonsymmetrically mounted nondetachable physical structure as being an audio cassette tape recorder (solely recorder) 41b having mounting post(s) for mounting the cassette tape reel(s) enclosing and mounting casing(s) mountable of the typically conventional-sized audio tape cassette of FIG. 2. Additionally are conventional features such as the speaker 36b, the operational keys (switches) 37b and lid 42' and hinges 42a' thereof.

FIG. 12 diagrammatically and symbolically illustrates an elevation plan top view of a video recorder of this invention, receivable of the video tape casing of FIG. 3, other than for noted features of this invention, being otherwise the same as typically a conventional video recorder 41a. Additionally illustrated features not previously described, include the conventional video screen 43, the video casing insert-hinged door 44 having hinges 44a and 44b

FIG. 13 diagrammatically and symbolically illustrates plan front-edge view of a video recorder 41b of FIG. 12, receivable of the video tape casing of FIG. 3, other than for noted features of this invention, being otherwise the same as typically a conventional video recorder 41b, including the previously described operational keys 39b, and the invention's raised male member 29 on which slot 28 (shown in cutaway portion 45 of the insertion hinged door 44) rides during insertion and during the state of insertion of the video cassette casing.

We claim:

1. A tape cassette system comprising:
    a tape cassette having a feed reel and a takeup reel with tape thereon; a mounting cassette casing for enclosing the feed reel, the takeup reel and the tape; the mounting cassette casing having an exterior perimeter with a permanently removable nonreattachable blocking physical structure affixed to and protruding beyond the exterior perimeter of the mounting cassette casing;
    a first tape cassette apparatus, for recording or reproducing information to or from the tape enclosed in the mounting cassette casing, having a first seating floor with a first seating floor perimeter correlating to the exterior perimeter of the mounting cassette casing and a second tape cassette apparatus, for recording or reproducing information to or from the tape enclosed in the mounting cassette casing, having a second seating floor with a second seating floor perimeter correlating to the exterior perimeter of the mounting cassette casing; the permanently removable nonreattachable blocking physical structure of the tape cassette protrudes beyond the first seating floor perimeter such that upon insertion of the tape cassette into the first seating floor of the first tape cassette apparatus the permanently removable nonreattachable blocking physical structure breaks revealing an altered appearance and upon insertion of the tape cassette into the second seating floor of the second tape cassette apparatus the permanently removable nonreattachable blocking physical structure remains unaltered.

2. The tape cassette system of claim 1, wherein the mounting cassette casing has at least one mounting hole necessary for mounting in the first tape cassette apparatus.

3. The tape cassette system of claim 1, wherein the first tape cassette apparatus has at least one mounting structure in the first seating floor receivable only in the mounting cassette casing of the tape cassette.

4. The tape cassette system of claim 3, wherein the at least one mounting structure in the first seating floor is a plurality of mounting structures nonsymmetrically positioned on the seating floor of the first tape cassette apparatus.

5. The tape cassette system of claim 3, wherein the at least one mounting structure in the first seating floor of the first tape cassette apparatus is at least one mounting post.

6. The tape cassette system of claim 3, wherein the at least one mounting structure in the first seating floor is at least one surface indenture forming a surface recess.

* * * * *